Oct. 14, 1958 W. H. LYON 2,856,463
ROTARY MAGNETIC TRANSDUCER MEANS HAVING YIELDABLE HEADS
Filed Feb. 1, 1956 4 Sheets-Sheet 1
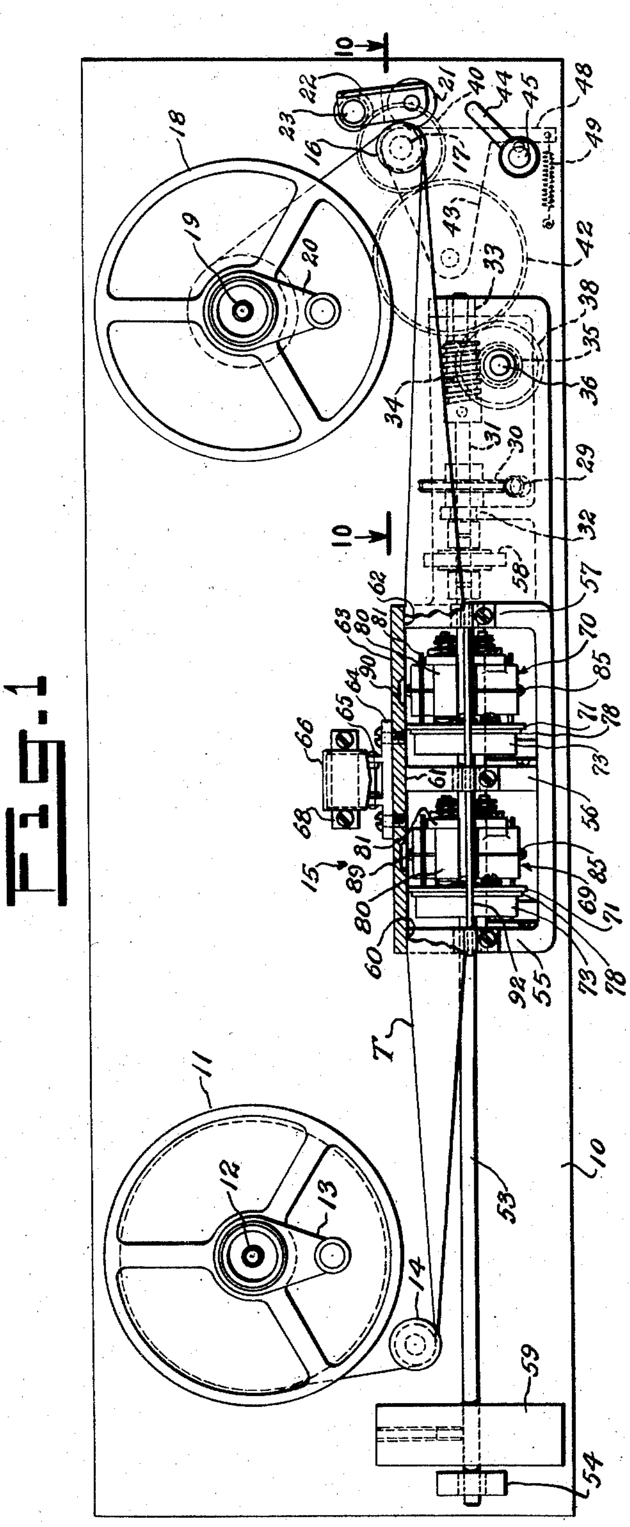
FIG. 1
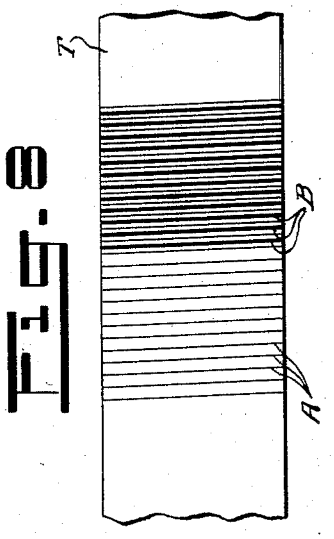
INVENTOR.
WILLIAM H. LYON
BY
H. G. Manning
ATTORNEY Oct. 14, 1958

W. H. LYON 2,856,463

ROTARY MAGNETIC TRANSDUCER MEANS
HAVING YIELDABLE HEADS

Filed Feb. 1, 1956

4 Sheets-Sheet 2

INVENTOR.
WILLIAM H. LYON
BY
H. G. Manning
ATTORNEY

Oct. 14, 1958 W. H. LYON 2,856,463

ROTARY MAGNETIC TRANSDUCER MEANS HAVING YIELDABLE HEADS

Filed Feb. 1, 1956 4 Sheets-Sheet 3

INVENTOR.
WILLIAM H. LYON
BY
H. G. Manning
ATTORNEY

Oct. 14, 1958

W. H. LYON

ROTARY MAGNETIC TRANSDUCER MEANS HAVING YIELDABLE HEADS 2,856,463

Filed Feb. 1, 1956

4 Sheets-Sheet 4

INVENTOR.
WILLIAM H. LYON
BY
H. G. Manning
ATTORNEY 2,856,463

ROTARY MAGNETIC TRANSDUCER MEANS HAVING YIELDABLE HEADS

William H. Lyon, Orange, Conn., assignor to The Sound-Scriber Corporation, New Haven, Conn., a corporation of Connecticut Application February 1, 1956, Serial No. 562,721

12 Claims. (Cl. 179—100.2)

This invention relates to apparatus for recording and reproducing intelligence on magnetic strip or tape material and more particularly to recording and reproducing apparatus wherein a plurality of magnetic transducer heads are mounted for rotation in a circular path transverse to the direction of movement of the tape, whereby such intelligence is recorded on the tape in a series of parallel spaced paths, disposed generally transversely with respect to the length of the tape.

One object of this invention is to provide apparatus of the above nature wherein the magnetic tape is held firmly in a semi-cylindrical cross sectional configuration during its lengthwise movement in conjunction with the rotating transducer means, said transducer means being provided with yieldable heads capable of conforming to the configuration of the tape at all times during their sweep across the width of the tape.

Another object is to provide an apparatus of the above nature wherein the arcuate configuration of the tape is held fixed during the passage of the tape in conjunction with rotating transducer means and whereby means is provided for maintaining constant pressure at all times between a transducer head and the tape during the passage of the head across the tape.

Another object is to provide apparatus of the above nature which will obviate wrinkling of the magnetic tape material caused by excessive pressure exerted by the pole piece of a transducer head, or the mis-alignment of the transducer head in the course of its sweep across the tape.

Still another object is to provide apparatus of the above nature wherein a rotating transducer head will be caused to move in a circular path in contact with magnetic tape having a fixed radius regardless of wear or adjustment of the head on its support.

A further object is to provide apparatus of the above nature whereby means is provided for automatically compensating for worn transducer pole pieces caused by normal wear when in use whereby uniform track speed will be insured and distortion in recording or reproducing intelligence will be reduced to a minimum.

Still another object is to provide apparatus for recording and reproducing with longitudinally moving magnetic tape, wherein said tape is confined in an arcuate cross section for operative engagement with said successive transversely movable magnetic transducer means, and wherein only a single pair of said transducer means will be required to record or reproduce an uninterrupted signal with said magnetic tape.

A still further object is to provide a device of the above nature which will be simple in construction, inexpensive to manufacture, easy to install and manipulate, compact, ornamental in appearance, and very efficient and durable in use.

With these and other objects in view, there has been illustrated on the accompanying drawings one form in which the invention may conveniently be embodied in practice.

In the drawings,

Fig. 1 represents a front elevation of one form of recording and reproducing apparatus using magnetic tape embodying the present invention.

Fig. 8 illustrates a portion of magnetic tape used with the foregoing apparatus and indicating diagrammatically the disposition of the parallel magnetic paths scanned by a pair of rotating transducer means to provide two separate channels of intelligence.

Figure 2:
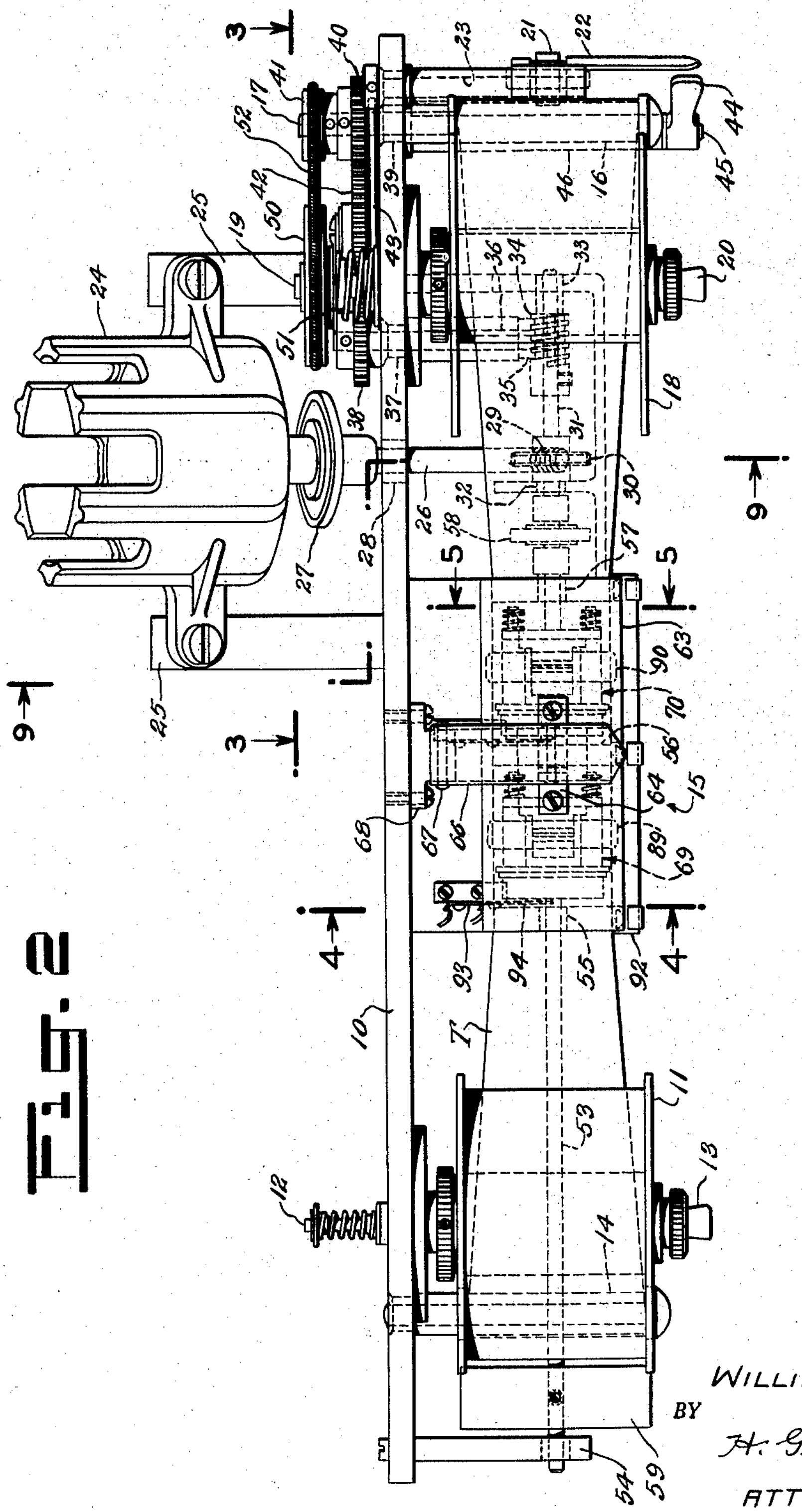
Fig. 2 is a plan view of the same.
Figure 5:
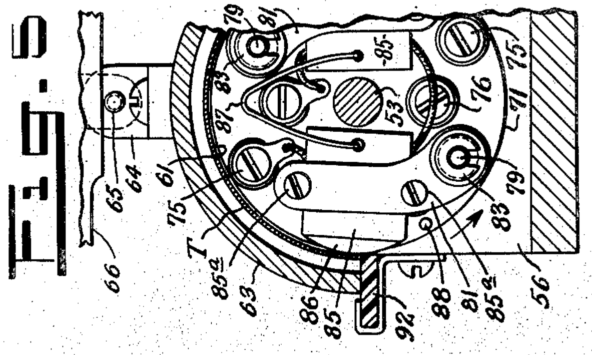
Fig. 5 is a fragmentary cross section taken on the line 5—5 of Fig. 2 and on a still more enlarged scale.
Figure 6:
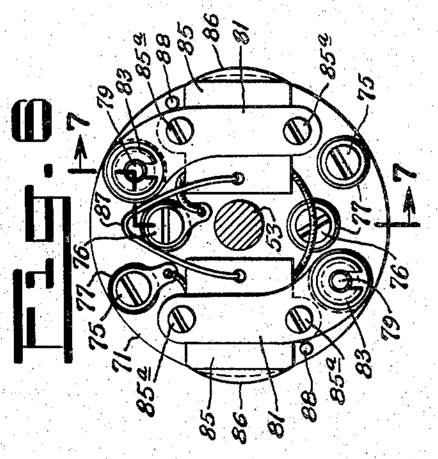
Fig. 6 is an end view of a rotary transducer means showing the mounting of the yieldable heads, on the same scale as Fig. 5.

Referring now to the drawing in which like reference numerals denote corresponding parts throughout the several views, the numeral 10 indicates the chassis plate upon which the remainder of the apparatus is mounted. At the left hand end of the chassis plate 10 a feed reel 11 containing the unused portion of the magnetic tape T is mounted on a spindle 12 and held in place thereon by a combination handle 13.

The tape T after it leaves the feed reel 11 passes under a tape guide spindle 14 and is drawn through the transducing means, indicated generally at 15, by means of a feed roller 16 carried on a shaft 17, after which the tape T goes to the take-up reel 18 which is removably attached to the shaft 19 by means of a combination handle 20.

Frictional contact between the tape T and the feed roller 16 is assisted by a pressure roller 21 mounted on an arm 22 which swings about a pivot 23.

A coil spring means (not shown) is also provided tending to urge the arm 22 in a direction so as to exert pressure between the pressure roller 21 and the feed roller 16.

Power to drive the apparatus is furnished by a motor 24 supported at the rear of the chassis plate 10 by the brackets 25. The motor 24 drives a stub shaft 26 through the flexible coupling 27. The stub shaft 26 is journalled at 28 in the chassis plate 10, and is provided with a worm gear 29 disposed in operative engagement with a gear 30 fixed on a shaft 31. The shaft 31 is supported on the chassis plate by bearings 32 and 33 and is also provided with a feed roller driving worm 34 disposed in operative engagement with a gear 35 attached at one end of a shaft 36, which is journalled as at 37 in the chassis plate 10, and is provided at its other end with a gear 38. The shaft 17 which carries the feed roller 16 is journalled in the chassis plate as at 39.

The shaft 17 also has fixed thereto a driving gear 40 and a take-up reel driving pulley 41. The gear 40 is driven by a tuning gear 42 which also meshes with the gear 38. The tuning gear 42 is rotatably mounted on a tuning plate 43, which in turn is swingably supported on the shaft 17.

The position of the tuning plate 43 is controlled by means of a tuning lever 44 at the front of the apparatus attached to a shaft 45 journalled in the bearing 46 attached to the chassis plate 10. At the rear end of the shaft 45, an eccentrically mounted pin 47 bears against the projection 48 of the tuning plate 43. The coil spring 49, which is connected between the chassis plate 10 and the projection 48, tends to urge the tuning plate 43 in one direction, this movement being limited by the engagement between the projection 48 and the eccentric pin 47.

The arrangement just described permits synchronization of the movement of the tape T and the transducer means 15, and is similar to an arrangement disclosed and claimed in my copending application Serial Number 406,517, filed January 27, 1954.

The take-up reel shaft 19 carries the pulley 50, loosely mounted thereon, but connected to the shaft 19 by friction clutch means 51 which permits the pulley 50 to overrun the shaft 19 in order to insure that no slack will accumulate in the tape T between the take-up reel 18 and the feed roller 16, regardless of the amount of tape on the reel 18. The pulley 50 is driven from the take-up reel driving pulley 41 by means of a belt 52.

Referring now to Fig. 1, it will be seen that the transducer means 15 includes a longitudinally extending head wheel shaft 53 supported at one end on the chassis plate 10, by means of a bearing 54 and at the other end passing through a series of three bearing supports 55, 56, and 57.

The shaft 53 is driven by the shaft 31 by means of the flexible coupling 58 and is provided with a flywheel 59 which, by effectively filtering out flutter and disturbances caused by the gears and driving system, provides a uniformly constant rate of rotation for the transducing means 15.

The upper portion of the bearing supports 55, 56, and 57 are formed so as to provide semi-cylindrical surfaces 60, 61, and 62 respectively disposed in alignment with each other and substantially in the direct path taken by the tape T as it moves between the tape guide spindle 14 and the feed roller 16. The radius of these surfaces is such that the tape T will be curved over these surfaces in a circular arc of slightly more than 180 degrees. The tape T will be held in this semi-cylindrical curved form during its passage through the transducer means 15 by the tape holding shoe 63, the interior surface of which is accurately formed to conform to the shape of the surfaces 60, 61, and 62. The tape holding shoe 63 is supported by a centrally located bracket 64 which has a pivotal connection at 65 with the arm 66, which in turn is pivotally supported at 67 by a bracket 68 attached to the chassis plate 10.

Figure 7:
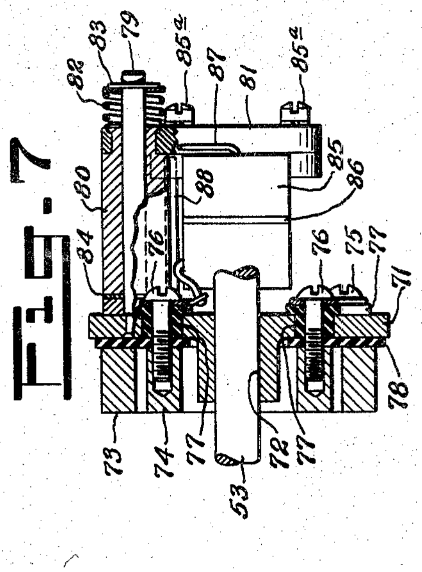
Fig. 7 is a cross sectional elevation taken on the line 7—7 of Fig. 6.
Figure 3:
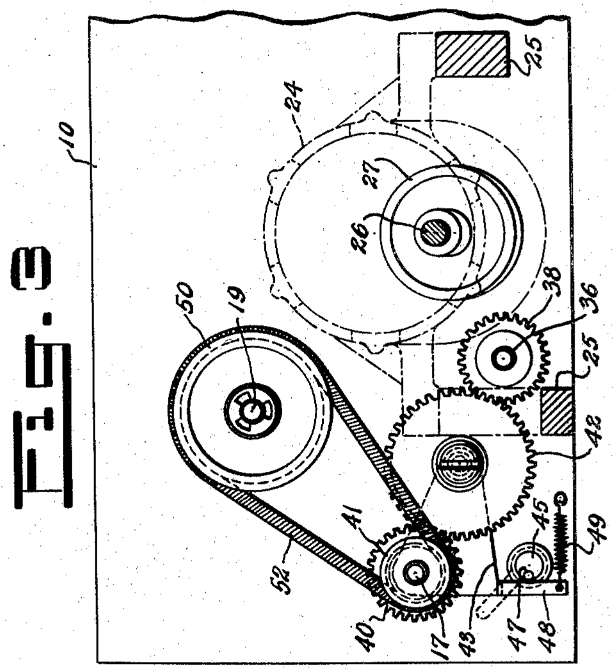
Fig. 3 is a fragmentary rear elevation of the same.
Figure 9:
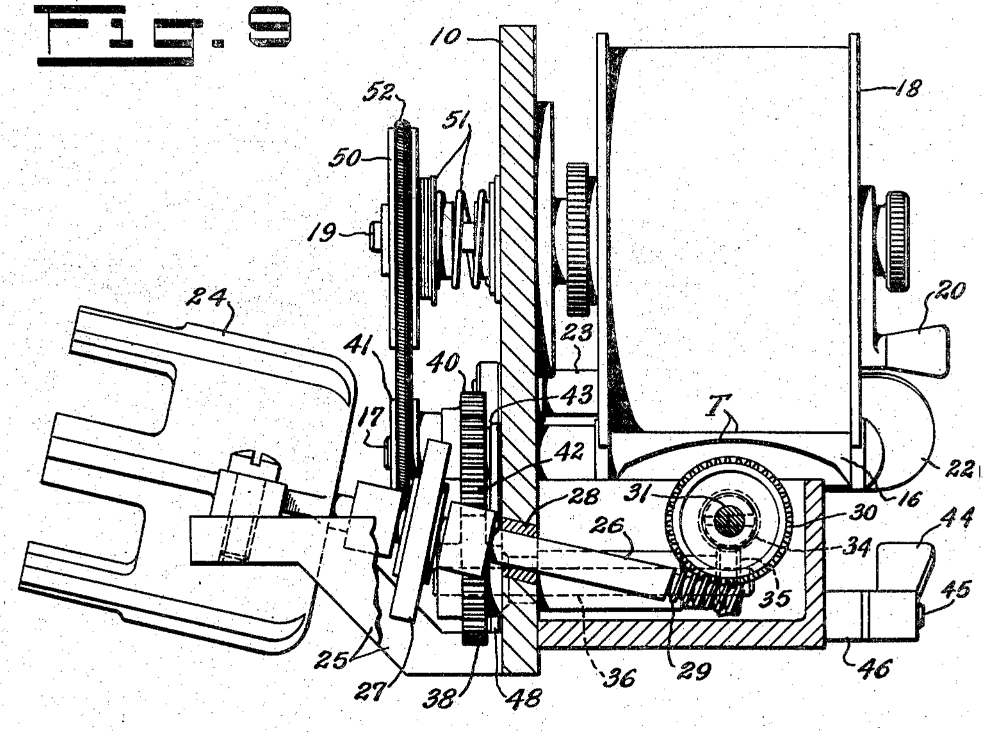
Fig. 9 is a cross sectional elevation taken on the line 9—9 of Fig. 2 and on a somewhat enlarged scale.
Figure 10:
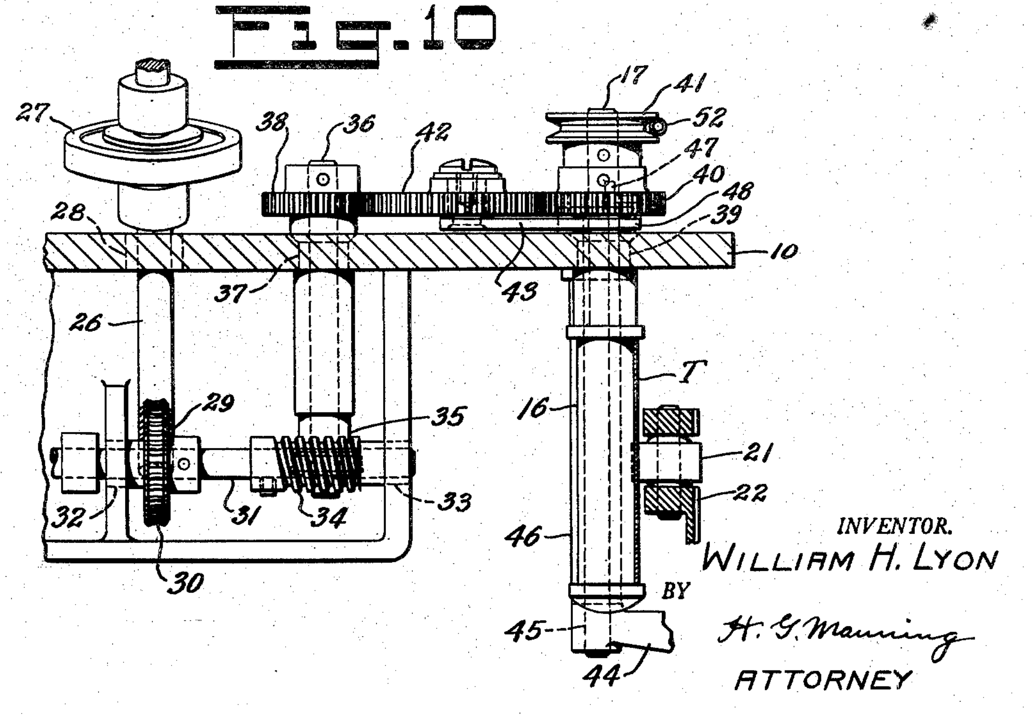
Fig. 10 is a cross section of a portion of the drive mechanism taken on the line 10—10 of Fig. 1 and on the same scale as that of Fig. 9.

In the apparatus shown in the present application, provision has been made for recording two channels of intelligence on the tape T as disclosed and claimed in my copending application Serial Number 538,151, filed October 3, 1955, and for this purpose two rotatable transducers indicated generally at 69 and 70 are provided. These transducers 69, 70 are identical in construction, one of them being fixed on the head shaft 53 between bearing supports 55 and 56, the other of them being fixed to the head shaft 53 between bearing supports 56 and 57. The detailed construction of the rotatable transducers 69 and 70 is more clearly shown in Figures 4, 5, 6, and 7, where it will be seen that the head wheel disk 71 is provided with a central opening 72 (Fig. 7) by means of which the disk 71 may be firmly attached to the shaft 53, so that the disk 71 will be maintained at right angles to the axis of rotation of the shaft 53.

Positioned on one side of the disk 71 are a pair of circumferentially extending concentrically disposed slip rings 73 and 74, which are made of some suitable electrically conductive material, and are attached to the disk 71 by pairs of diametrically positioned screws 75 and 76, respectively, said screws being insulated from the disk 71 by means of the insulating sleeves 77, while the slip rings 73 and 74 are separated from the disk 71 by means of an insulating disk 78. A pair of pivots 79 are firmly attached to the head wheel disk 71 so as to project outwardly from the other side. These pivots are positioned diametrically opposite to each other with respect to the axis of the shaft 53 and equidistantly spaced therefrom.

Each of the pivots 79 provides a rotatable support for a sleeve 80 having a radially extending arm 81. The sleeves 80 are held on the pivots 79 by means of coil springs 82 which are maintained under a slight compression by fastening means such as C-rings 83 which are slipped into annular grooves provided at the ends of the pivots 79. Washers 84 may be provided at the inner ends of the sleeves 80 in order to reduce the friction developed by rotation of the sleeves, and to reduce any tendency for them to stick in one position. Each of the arms 81 provides support for identical magnetic transducer heads 85 which are attached to the arms by means of the screws 85*a* so that the pole pieces 86 of the heads 85 are disposed so as to face radially outwardly and in axial alignment with each other. The radial distance of the pole pieces 86 from the axis of rotation of the shaft 53 is such that limited radial movement of the arms 81 will permit each of the pole pieces to maintain contact at all times over the entire arcuate width of the tape T during rotation of the head wheel disk 71.

A U-shaped spring 87, each end of which is attached to one of the heads 85, urges the heads outwardly at all times. In addition, means are employed such as stop pins 88 to positively limit outward travel of the heads 85. The limited travel permitted by the stop pins 88 should be such that as the pole pieces 86 sweep across the tape T, a small amount of radial flexing of the tape T in contact with the pole pieces may take place, which will be permitted by the provision on the underside of the tape holding shoe 63 of the upwardly recessed recording track grooves 89 and 90. A certain amount of additional movement will also be permitted by the stop pins 88 in order to take care of possible wearing down of the pole pieces 86. It will thus be apparent that after a head 85 has made a sweep over the tape T, the pole piece 86 will be extended somewhat beyond its normal position. Therefore, a head approach guide 91, which may comprise a piece of molded nylon or other wear resistant plastic material, is secured along the lower edge of the tape holding shoe 63 which serves to return each pole piece 86 inwardly to conform to the fixed radius of the tape as it begins its sweep across the tape T. Due to the fact that the frictional engagement of the pole piece 86 with the tape T would normally tend to carry the tape T around in the direction of rotation of the pole pieces, a stop plate 92 is provided along one edge of the tape T to maintain it in proper alignment.

In the apparatus shown, the transducer heads 85 in each of the transducers 69 and 70 are connected in series, one of the leads being connected to the slip ring 73 by means of one of the screws 75, the other of said leads being connected to the slip ring 74 by means of a screw 76. The electrical connections to the slip rings are made by means of brushes 93 and 94 respectively.

*Operation*

Figure 4:
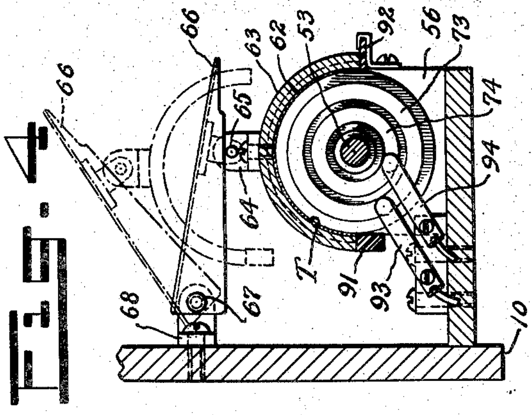
Fig. 4 is a cross-sectional elevation on the line 4—4 of Fig. 2 and on a slightly enlarged scale.

To use the above described apparatus either for recording or reproducing intelligence, the first step is to raise the tape holding shoe 63 to the dotted line position shown in Figure 4.

The feed roll 11 containing unused magnetic tape T is then placed on the spindle 12 and secured by means of the handle 13, after which the tape T is led around and under the spindle 14 through the transducer means 15 passing the tape over the semi-cylindrical surfaces 60, 61 and 62 and under the tape holding shoe 63 to the feed roller 16, the pressure roller 21 being moved to the right to allow the insertion of the tape therebetween.

The tape is then connected to the hub of an empty take-up reel 18. The tape holding shoe 63 will then be lowered to the position as shown in solid lines in Fig. 4, and current may then be supplied to the motor 24 to begin operation. For the purpose of recording intelligence on the tape T, no further adjustment will be necessary. Operation of the motor 24 will produce rotation of the shaft 31 and the head wheel shaft 53 in a clockwise direction as viewed in Fig. 4. Rotation of the shaft 31 will produce counterclockwise rotation (as viewed in Fig. 1) of the feed roller 16, through the medium of the gears 38, 42, and 40.

At the same time, the take-up reel 18 will also be caused to move in a counterclockwise direction. However, while the motor 24, and consequently the feed roller 16, are intended to rotate at a uniform rate of speed, the rotation of the take-up reel will vary in accordance with the amount of tape T which has accumulated thereon. The purpose of the friction clutch means 51, which is driven by a belt 52, connecting pulleys 41 and 50 is to accommodate this variation, as is well understood in the art. At the same time, rotation of the head wheel shaft 53 will turn the magnetic transducers 69 and 70 to cause the transducer heads 85 to make successive sweeps across the width of the tape T in a clockwise direction as viewed in Fig. 4, it being understood that as one of the transducer heads 85 on each of the transducer means 69 and 70 is about to leave the lower right hand edge of the tape T as viewed in Fig. 4, the other of the heads 85 on each of the transducer means 69 and 70 will begin its sweep at the left hand edge of the tape T.

In prior devices of this type, it has been necessary to provide at least three or more transducer heads spaced about the periphery of a rotating transducer means. Due to the fact that uniform contact could not be maintained between the pole piece of the transducer head and the magnetic tape, the tape had to be temporarily confined in a circular cross section extending over an arc of as much as 180 degrees. Under such conditions, using fixed heads and fixed pressure shoes it was found that the tape was subject to wrinkling which produced disturbances in recording. However, these difficulties have been eliminated in the present invention, by the provision of means which allows uniform pressure to be maintained between the tape and the transducer heads despite any irregularities which may exist in the cross sectional configuration of the tape during its longitudinal movement. The sound tracks will thus always be at a fixed radius from the axis of the head wheel, the transducer heads yielding automatically to conform to the radius of the head wheel irrespective of wear.

It should also be understood that the axial distance between the pole pieces 86 of the transducer means 69 and the pole pieces 86 of the transducer means 70, as measured along the length of the tape T, will be such that the paths swept by the pole pieces of the transducer means 69 will be alternately spaced on the tape T between the paths swept by the pole pieces 86 of the transducer means 70, as is more fully described in my copending application, Serial Number 538,151, filed October 3, 1955.

It should also be understood that the invention disclosed herein will be applicable to apparatus using only a single rotating transducer means, such as 69 or 70, and that if desired, additional transducer means might be employed to provide additional channels of communication.

Whenever it is desired to reproduce intelligence which has been recorded on the tape T, the procedure for threading the tape T through the transducer means 15 and the feed roller 16 is the same as when it is to be recorded on the tape T, the tape moving as before from the feed reel 11 to the take-up reel 18. However, due to the fact that the magnetic paths A and B have previously been established at pre-determined intervals along the length of the tape T, it is necessary that the proper phase relationship be established between the longitudinal movement of the tape T produced by the feed roller 16 and the transverse movement of the individual transducer heads 85, so that as each of the heads 85 reaches the left hand edge of the tape T as viewed in Fig. 4, the appropriate magnetic path will be positioned in axial alignment therewith.

This phase relationship can be quickly and easily established by means of the tuning gear 42, which when its axis is shifted by rotation of the tuning plate 43 about its pivot arm shaft 17, will cause a corresponding increase or decrease in the speed of rotation of the feed roller 16, until synchronism has been established between the movement of the heads 85 and their respective paths A and B. Once this synchronism has been established, the position of the tuning gear 42 may be left unchanged. Adjustment of the tuning gear 42 is accomplished by means of the tuning lever 44, the rotation of which will cause the eccentric pin 47 to shift the tuning gear 43 by engagement with the projection 48. The tuning mechanism just described is also disclosed and claimed in my copending application, Serial Number 406,517, filed January 27, 1954, and does not form any part of the present invention.

While there has been disclosed in this specification one form in which the invention may be embodied, it is to be understood that this form is shown for the purpose of illustration only and that the invention is not limited to this specific disclosure but may be modified and embodied in various other equivalent forms without departing from its spirit. In short, the invention includes all the modifications and embodiments coming within the scope of the following claims.

Having thus fully described the invention what is claimed as new and for which it is desired to secure Letters Patent is:

1. In magnetic transducing apparatus, the combination including a pair of magnetic transducer heads each having a member adapted for operative engagement with flexible magnetic material, a drum structure, means including said drum structure to mount said transducer heads for rotation about a common axis, said operative members being disposed in diametrically opposed relationship in said drum structure, means to hold said flexible magnetic material in an arcuate configuration for engagement with said operative members during said rotation, and means in said drum structure to yieldably support said transducer heads for limited radial movement during operative engagement.

2. In magnetic transducing apparatus, the combination including a pair of magnetic transducer heads each having a member adapted for operative engagement with flexible magnetic material, means to mount said transducer heads for rotation about a common axis, said operative members being disposed in diametrically opposed relationship, means to hold said flexible material in an arcuate configuration for engagement with said operative members during said rotation, and means to yieldably support said transducer heads for limited radial movement during operative engagement, said transducer head mounting means comprising a disc-shaped member provided with a pair of spaced pivots extending angularly with respect to the plane of said disc-shaped member, said transducer heads being swingable one each about said pivots, the operative members being offset with respect to their respective pivotal axes.

3. The invention as defined in claim 2, wherein spring means is provided to urge said transducer heads radially inwardly.

4. The invention as defined in claim 3, wherein said spring means is connected between said transducer heads.

5. In an apparatus for recording and reproducing intelligence with magnetic tape material, the combination including means to feed said tape longitudinally, a rotatable drum, a magnetic transducer head mounted in said drum for movement in an arcuate path disposed transversely with respect to the direction of movement of said tape, a tape holding shoe having an arcuate cross section to position said tape in contact with this said transducer head, and a radially movable element within said drum and interconnecting said drum and said transducer head to permit said transducer head to conform to the configuration of said tape during movement in said arcuate path.

6. In an apparatus for recording and reproducing intelligence with magnetic tape material, the combination including means to feed said tape longitudinally, a rotatable drum a magnetic transducer head mounted in said drum for rotation about an axis substantially parallel to the direction of movement of said tape, a semi-cylindrical tape holding shoe to position said tape in contact with said transducer head during said rotation, said mounting for the transducer head including radially movable means within said drum to permit said transducer head to conform to variations in the configuration of said tape.

7. The invention as defined in claim 6, wherein guide means is provided for engagement with said transducer head to position said head in radial alignment with the edge of said tape before said head comes in contact therewith.

8. The invention as defined in claim 7, wherein said guide means includes an alignment guide composed of plastic material attached at one edge of said tape holding shoe.

9. In an apparatus for recording and reproducing intelligence with flexible magnetic strip material, the combination including means to move said strip material in a substantially straight line, means to confine said moving strip material in a semi-circular cross-sectional configuration extending over an arc of at least 180 degrees, said confining means including semi-cylindrical holding means and transducer means rotatable about the axis of said holding means, said transducer means including a pair of pole pieces faced 180 degrees apart for alternative operative engagement with said material, one of the means comprising said tape confining means having an element mounted for limited radial movement to maintain uniform pressure between said pole pieces and said strip material.

10. In an apparatus for recording and reproducing intelligence with magnetic tape material, the combination comprising means to move said tape longitudinally, a disk-shaped member adapted to be mounted on a shaft for rotation about its central axis, means for conforming said moving tape arcuately about the periphery of said disc-shaped member a pivotal support member on said disk spaced from said central axis and extending parallel thereto, an arm mounted on said pivotal support member for swingable movement toward and away from said central axis, spring bias means for urging said arm radially inwardly in opposition to centrifugal force, and a magnetic transducer head mounted on said arm and engageable with said arcuately conformed tape.

11. The invention as defined in claim 10, wherein means is provided to resist the swinging movement of said arm in either direction.

12. The invention as defined in claim 10, wherein friction means is provided on said support member to resist swinging movement of said arm.

References Cited in the file of this patent

UNITED STATES PATENTS

| | | |
|---|---|---|
| 2,245,286 | Marzocchi | June 10, 1941 |
| 2,612,566 | Anderson | Sept. 30, 1952 |
| 2,648,589 | Hickman | Aug. 11, 1953 |